Patented Sept. 27, 1949

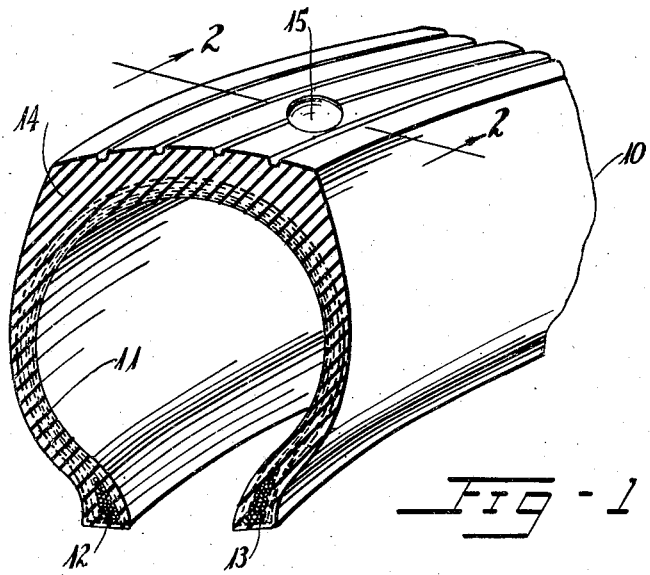
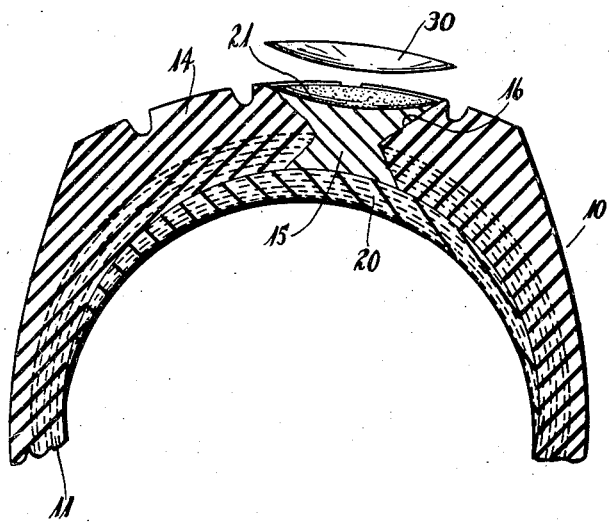

2,483,010

UNITED STATES PATENT OFFICE 2,483,010

TIRE CASING AND METHOD OF REPAIRING SAME

James M. Hooper, Akron, Ohio, assignor to The B. F. Goodrich Company, New York, N. Y., a corporation of New York Application August 29, 1946, Serial No. 693,746

5 Claims. (Cl. 152—367)

1

This invention relates to tire casings and is especially useful in the repair of damaged casings.

In prior procedures of repairing an opening in a damaged tire casing, the damaged cord or fabric about the opening has been trimmed away so as to present walls of firm tire material, the opening being flared outwardly toward the tread surface of the tire throughout the rubber-like material of the tread so that its greater diameter is at the tread surface and flared inwardly throughout the cord or fabric carcass so as to be of greater diameter at the inner face of the casing. The resulting opening has been completely filled with repair material in plastic form and heat and pressure have been applied to vulcanize the repair. In such repairs after vulcanization, the applied rubber-like material has been found to extend at least flush with the flared opening at the tread surface and usually bulges therebeyond so that as the patched surface has come in contact with the ground, pressure of the vehicle has caused objectionable spreading deformation of the patch setting up shear stresses at its bonding marginal surfaces and causing separation of the patch from the tire. This has been true even where the surface of the patch has been flush with the tread surface of the tire due to the fact that the tread surface is convex both circumferentially and laterally of the tire.

The present invention aims to overcome the foregoing and other difficulties by providing a repair having a dished or concave surface at the tread of the tire whereby pressure of the tire tread against the ground about the patch tends to constrict the margins of the patch.

Objects of the invention are to provide a repair having minimum spreading action under ground contact, to provide good marginal adhesion, and to provide convenient procedure of repairing.

These and other objects will appear from the following description and the accompanying drawings.

Of the drawings,

Fig. 1 is a perspective view of a section of a tire having a repair made in accordance with and embodying the invention.

Fig. 2 is a cross-section thereof taken on line 2—2 of Fig. 1.

Referring to the drawings, the numeral 10 designates a pneumatic tire casing having a carcass 11 of rubberized cord or fabric extending between and anchored to inextensible bead cores 12, 13 at its margins, and a tread 14 of wear-resisting vulcanized rubber or other rubber-like material. The tire repair indicated by the numeral 15 has been built into an aperture 16 formed in the tire casing by removal of damaged tire material about an opening formed by a blow out or other injury to the casing. The casing has also been reinforced about the injury on the inside of the casing by application of a patch 20 of rubberized fabric or cord.

The aperture 16 is formed by skiving, buffing, or trimming the rubber and fabric material so as to flare outwardly throughout the tread 14 of the casing and to flare inwardly throughout the carcass portion of the casing with its smallest dimension intermediate the tread surface and the inner surface of the casing. The repair comprises a filling of rubber-like material of hourglass shape vulcanized to the casing and filling the aperture. The outer face of the repair is flush with the tread surface of the casing at its flattened margins and is concave in all directions as at 21 so that its center is spaced below the tread face and does not contact with the pavement when the tire is rolling over a flat surface. The concavity of the outer face of the repair prevents laterally outward deformation of the repair under contact of the tread surface with the pavement while the tread about the repair is free to be deformed in a direction toward the margins of the repair under such pressure of pavement contact, while at the same time the repair is relatively thin and feathered at its margins and the concavity permits deflection toward the center of the repair with the margins of the tread surrounding the repair thereby greatly reducing stresses tending to tear the repair loose at its margins.

In building the repair into a damaged tire casing, the material of the casing about the injury is trimmed or buffed away and the aperture is skived or flared automatically to the tread face of the casing and inwardly to the inner face of the carcass. The walls of the aperture are then coated with rubber cement. Then unvulcanized rubber is built into the aperture, the last plies of rubber being feathered toward the margins of the aperture and the aperture being filled to about one-sixteenth of an inch of the tread surface of the center of the repair. The exposed surface is then treated as by dusting with powdered soapstone or coating it with a liquid containing soapstone to prevent adhesion with overlying material. A pressure pad 30 having a convex lower face is then laid over the repair and the tire placed in a vulcanizer which applies pressure to the pad over the repair and forms a concave depressed surface in the repair. The pressure pad may be of any material and a pad of rubber may be used for the purpose provided that soapstone or other separating material is employed to prevent adhesion of the pad to the repair.

A reinforcement 20 of rubberized fabric or cord may be vulcanized to the inner face of the carcass in the same vulcanizing operation or the reinforcing pad may be omitted if desired.

While the invention has been described as employed in repairing a through-aperture in a tire casing, it may also be employed where the injury does not extend entirely through the casing in which case the tire casing is merely hollowed out to provide a flared cavity and rubber-like material is cemented and vulcanized therein to provide an outer concave surface across the repair at the tread surface.

Variations may be made without departing from the scope of the invention as it is defined by the following claims.

I claim:

1. A tire article having a portion of its tread material removed to provide a cavity having walls flared outwardly toward its tread surface, and a body of tread material vulcanized in said cavity, said body having a concave surface at the tread face of the article and feathered margins overlying the flared walls of the cavity and extending substantially to the tread surface of the article the concavity of said body providing relief from road pressure tending to spread said body, and said feathered margins providing gradually decreased resistance to stretch of said body and consequent increased resistance to separation of said body from walls of the tire article at the margins of said body.

2. A pneumatic tire casing having a portion of its tread material removed to provide a cavity having walls flared outwardly toward its tread surface, and a body of tread material vulcanized in said cavity, said body having a concave surface at the tread face of the casing and feathered margins overlying the flared walls of the cavity and extending substantially to the tread face of the casing the concavity of said body providing relief from road pressure tending to spread said body, and said feathered margins providing gradually decreased resistance to stretch of said body and consequent increased resistance to separation of said body from walls of the tire article at the margins of said body.

3. A pneumatic tire casing having a carcass portion and a tread portion overlying it, said casing having a portion of its wall removed to provide an aperture therethrough having walls flared inwardly throughout its carcass portion and outwardly throughout its tread portion to its tread face, and a body of rubber-like material vulcanized to said casing in said aperture, said body having a concave face at the tread surface of the casing with its margins feathered and overlying the flared walls of the aperture and extending substantially to the tread face of the casing the concavity of said body providing relief from road pressure tending to spread said body, and said feathered margins providing gradually decreased resistance to stretch of said body and consequent increased resistance to separation of said body from walls of the tire article at the margins of said body.

4. The method of repairing a tire casing comprising removing material of the tread to provide a cavity having outwardly flared walls, partially filling the cavity so formed with unvulcanized rubber-like material, and vulcanizing said material in place while depressing the central portion of the material at the tread face of the casing below the margins thereof at the tread face by molding pressure to provide a concave face having feathered margins overlying said flared walls and extending substantially to the tread face of the casing providing relief from expansion of the repair under road pressure and increased resistance to separation of the repair from the tire.

5. The method of repairing a tire casing which comprises removing material to provide an aperture extending through the casing with its walls flared inwardly from a position intermediate its thickness to the inner face of the casing and flared outwardly from said intermediate position to the tread face of the casing, partially filling the aperture so formed with unvulcanized rubber-like material, applying convex-faced pressure means over the filling of material and vulcanizing said material in place while applying pressure thereto through said pressure means at the tread face of the casing to provide a concave face having feathered margins overlying said flared walls and extending substantially to the tread face of the casing providing relief from expansion of the repair under road pressure and increased resistance to separation of the repair from the tire.

JAMES M. HOOPER.

REFERENCES CITED

The following references are of record in the file of this patent:

UNITED STATES PATENTS

| Number | Name | Date |
|---|---|---|
| 2,229,878 | Wilson | Jan. 28, 1941 |
| 2,421,096 | Vogt | May 27, 1947 |

FOREIGN PATENTS

| Number | Country | Date |
|---|---|---|
| 556,598 | Great Britain | Oct. 12, 1943 |